United States Patent
Chang et al.

(10) Patent No.: US 8,258,757 B2
(45) Date of Patent: Sep. 4, 2012

(54) CHARGING METHOD AND CHARGING DEVICE FOR CHARGING A RECHARGEABLE BATTERY

(75) Inventors: Chung-Hsing Chang, Guei-Shan (TW); Wen-Yi Chen, Guei-Shan (TW); Chia-Liang Lin, Guei-Shan (TW)

(73) Assignee: Dynapack International Technology Corp., Taoyuan (TW)

( * ) Notice: Subject to any disclaimer, the term of this patent is extended or adjusted under 35 U.S.C. 154(b) by 309 days.

(21) Appl. No.: 12/785,145

(22) Filed: May 21, 2010

(65) Prior Publication Data

US 2011/0285359 A1     Nov. 24, 2011

(51) Int. Cl.
*H01M 10/44* (2006.01)
*H01M 10/46* (2006.01)

(52) U.S. Cl. ...................................... 320/162

(58) Field of Classification Search .................. 320/125, 320/137, 160, 162, 163, 164
See application file for complete search history.

(56) References Cited

U.S. PATENT DOCUMENTS

| | | | |
|---|---|---|---|
| 7,570,023 B2* | 8/2009 | Hsu et al. | 320/132 |
| 2003/0006734 A1* | 1/2003 | You | 320/125 |
| 2008/0218130 A1* | 9/2008 | Guo et al. | 320/162 |

* cited by examiner

*Primary Examiner* — Edward Tso
(74) *Attorney, Agent, or Firm* — Ming Chow; Sinorica, LLC

(57) ABSTRACT

A charging method fit for use with and applicable to a rechargeable battery is provided. The charging method involves charging the rechargeable battery to a first preset voltage and then charging the rechargeable battery to a second preset voltage. The charging method includes the steps of: (a) using the first preset current as a charging current, and performing the constant current charging of the rechargeable battery by the first preset current until the rechargeable battery reaches the first preset voltage for the first instance; (b) subtracting a current difference value from the charging current used by the rechargeable battery to reach the first preset voltage in the preceding instance so as to obtain a new charging current, and performing the constant current charging of the rechargeable battery by the new charging current thus obtained until the rechargeable battery reaches the first preset voltage again; (c) repeating step (b) until the new charging current equals a second preset current; and step (d) using the second preset current of step (c) as another new charging current, and performing the constant current charging of the rechargeable battery by the second preset current until the rechargeable battery reaches a second preset voltage for the first instance.

20 Claims, 3 Drawing Sheets

CHARGING METHOD AND CHARGING DEVICE FOR CHARGING A RECHARGEABLE BATTERY

FIELD OF THE INVENTION

The present invention relates to charging methods and charging devices, and more particularly, to a charging method for charging a rechargeable battery and a charging device for serving this purpose and thereby shortening the duration of charging.

BACKGROUND OF THE INVENTION

US20080309293A1, entitled "Method for Charging Battery Module in Multiple Stages," discloses a method for charging a battery module in multiple stages. The method is configured for use with a battery module including a plurality of parallel-connected battery cells. US20080309293A1 discloses that the method is implemented by voltage control or current control to maintain a constant current for charging the battery module in an initial stage of charging. A charging current is lowered substantially to reduce the charging speed when the voltage of one of the parallel-connected battery cells exceeds a safety value or a total voltage of the battery module itself reaches a rated voltage. Accordingly, a safety problem of the battery can be avoided and meanwhile, the life span of the battery can be prolonged. However, the above technical solution disclosed in US20080309293A1 has a drawback; that is, lowering the charging current substantially to reduce the charging speed inevitably results in extending the duration of charging.

In light of the aforesaid drawbacks of the prior art, the inventor of the present invention is devoted to the improvement of the prior art and thus proposes a charging method and a charging device for use with a rechargeable battery with a view to shortening the duration of charging the rechargeable battery.

SUMMARY OF THE INVENTION

It is an objective of the present invention to provide a charging method and a charging device for use with a rechargeable battery so as to shorten the duration of charging the rechargeable battery.

In order to achieve the objectives described above, the present invention provides a charging method fit for use with and applicable to a rechargeable battery, the charging method being configured to charge the rechargeable battery to a first preset voltage and then charge the rechargeable battery to a second preset voltage, the charging method comprising the steps of: (a) using a first preset current as a charging current, followed by performing constant current charging of the rechargeable battery by the first preset current until the rechargeable battery reaches the first preset voltage for the first instance; (b) subtracting a current difference value from the charging current used by the rechargeable battery to reach the first preset voltage in the preceding instance so as to obtain a new charging current, followed by performing constant current charging of the rechargeable battery by the new charging current thus obtained until the rechargeable battery reaches the first preset voltage again; (c) repeating step (b) until the new charging current equals a second preset current; and (d) using the second preset current of step (c) as another new charging current, followed by performing constant current charging of the rechargeable battery by the second preset current until the rechargeable battery reaches the second preset voltage for the first instance.

Moreover, in order to achieve the above-mentioned objectives, the present invention provides a charging device fit for use with and applicable to a rechargeable battery, the charging device being configured to charge the rechargeable battery to a first preset voltage and then charge the rechargeable battery to a second preset voltage, the charging device comprising: a controller connected to a charger circuit and a voltage detection circuit and configured to perform the following processes: (a) using a first preset current as a charging current, followed by performing constant current charging of the rechargeable battery by the first preset current until the rechargeable battery reaches the first preset voltage for the first instance; (b) subtracting a current difference value from the charging current used by the rechargeable battery to reach the first preset voltage in the preceding instance so as to obtain a new charging current, followed by performing constant current charging of the rechargeable battery by the new charging current thus obtained until the rechargeable battery reaches the first preset voltage again; (c) repeating process (b) until the new charging current equals a second preset current; and (d) using the second preset current of process (c) as another new charging current, followed by performing constant current charging of the rechargeable battery by the second preset current thus obtained until the rechargeable battery reaches the second preset voltage for the first instance; the charger circuit being controlled by the controller, connected to the rechargeable battery, and configured to provide the charging current for process (a) through process (d); and the voltage detection circuit being controlled by the controller, connected to the rechargeable battery, and configured to detect the voltage of the rechargeable battery.

BRIEF DESCRIPTION OF THE DRAWINGS

To enable examiners to gain insight into the structure, features, and advantages of the present invention, the present invention is hereunder illustrated with preferred embodiments and accompanying drawings, wherein.

DETAILED DESCRIPTION OF THE INVENTION

Figure 1:
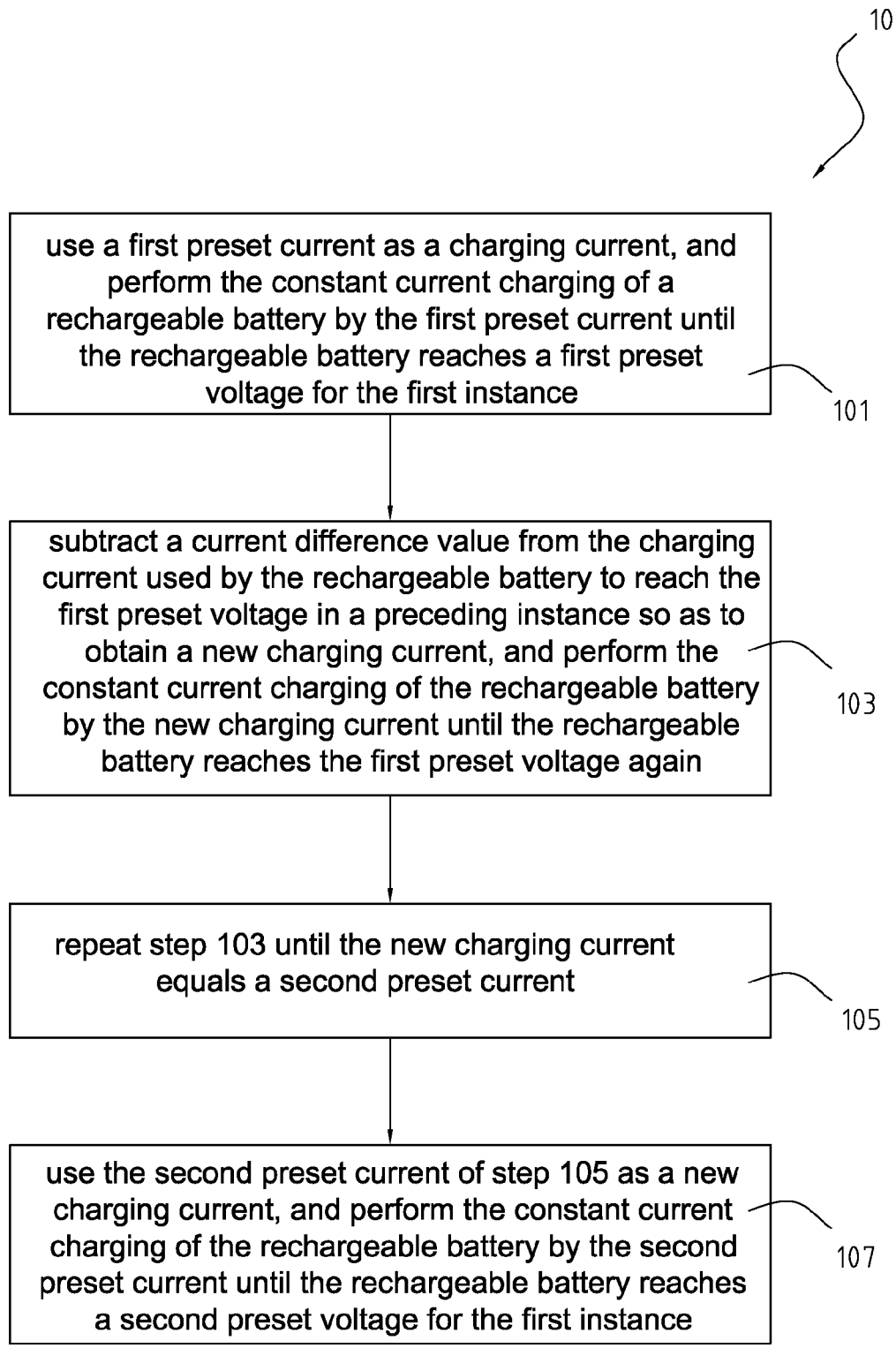
FIG. 1 is a flow chart of a charging method for a rechargeable battery according to the present invention.
Figure 2:
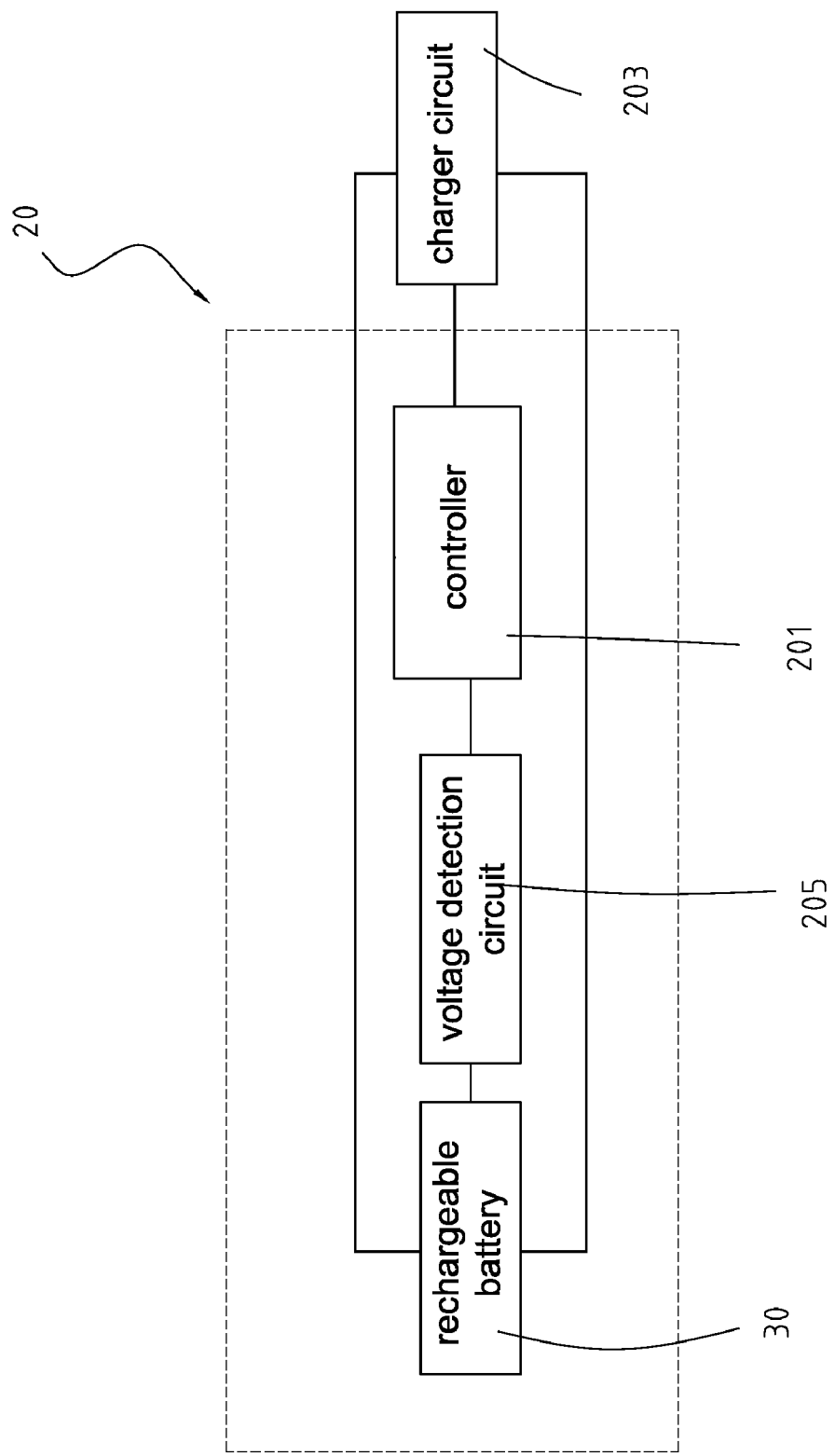
FIG. 2 is a schematic view of the framework of a charging device for use with a rechargeable battery according to the present invention.

FIG. 1 is a flow chart of a charging method for a rechargeable battery according to the present invention, and FIG. 2 is a schematic view of the framework of a charging device for use with a rechargeable battery according to the present invention. A charging method 10 of the present invention is implemented in multiple stages. In the multiple-stage charging method, the charging method 10 is adopted when a rechargeable battery 30 is charged such that, at each stage, the instantaneous voltage $V_n$ of the rechargeable battery 30 becomes voltage $V_{n+1}$, where n is a positive integer greater than zero. The charging method 10 of the present invention is applicable to the rechargeable battery 30 that is composed of at least a lithium-ion rechargeable battery cell, a lithium-polymer rechargeable battery cell, or any other rechargeable battery cell.

The rechargeable battery 30 is exemplified by a lithium-polymer rechargeable battery hereunder to describe in detail how the lithium-polymer rechargeable battery 30 is charged by the charging method 10 of the present invention, though the present invention is not limited by the exemplification. According to the product specification provided for the lithium-polymer rechargeable battery 30 by the manufacturer thereof, the lithium-polymer rechargeable battery 30 has a rated voltage of 3.65V and a maximum charging voltage ($V_{chg}$) of 4.2V. The operation conditions of the constant current charging of the lithium-polymer rechargeable battery 30 at temperature between 20° C. and 50° C. are as follows: charging the lithium-polymer rechargeable battery 30 to a voltage of 4.0V by a constant current of 0.8 C; charging the lithium-polymer rechargeable battery 30 to a voltage ranging between 4.0V and 4.1V by a 0.2 C constant current; and charging the lithium-polymer rechargeable battery 30 to a voltage ranging between 4.1V and 4.2V by a 0.1 C constant current. The operation conditions of the constant voltage charging of the lithium-polymer rechargeable battery 30 at a temperature ranging between 20° C. and 50° C. are as follows: charging the lithium-polymer rechargeable battery 30 at a constant voltage of 4.2V until the charging operation is completed when a charging current is less than or equal to 0.05 C.

To comply with the operation conditions of the constant current charging described above, a multiple-stage charging method is required for the constant current charging of the lithium-polymer rechargeable battery 30. In the first stage, the lithium-polymer rechargeable battery 30 is for example, charged from a voltage of 3V ($V_1$) to a voltage of 4.0V ($V_2$). In the second stage, the lithium-polymer rechargeable battery 30 is charged from a voltage of 4.0V ($V_2$) to a voltage of 4.1V ($V_3$). In the third stage, the lithium-polymer rechargeable battery 30 is charged from a voltage of 4.1V ($V_3$) to a voltage of 4.2V ($V_4$). The charging method 10 of the present invention is implemented in the first, second, and third stages respectively.

Figure 3:
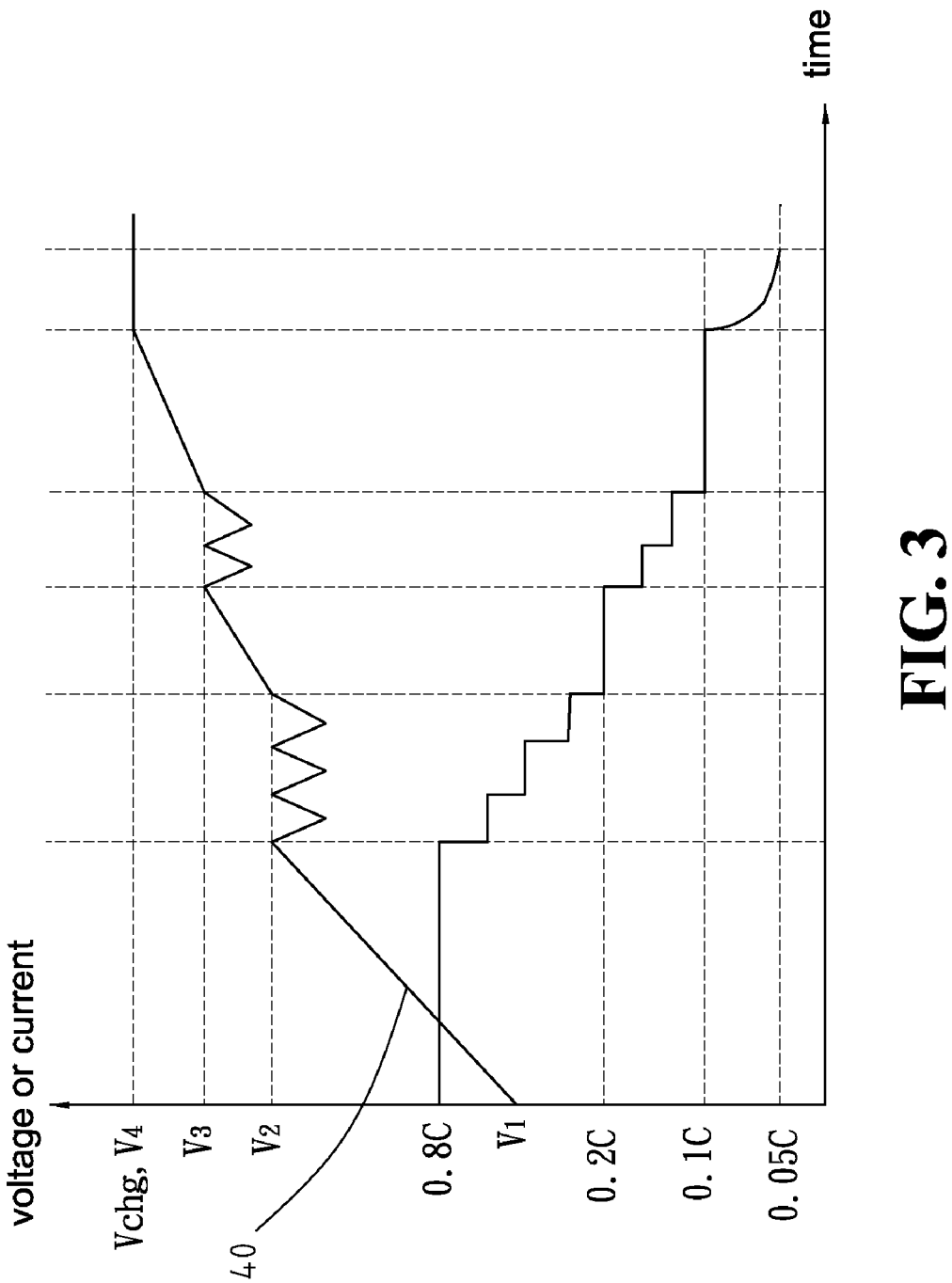
FIG. 3 is a charging curve about the charging of a rechargeable battery by the charging method according to the present invention.

The charging method 10 of the present invention comprises step 101 through step 107 described hereunder. In step 101, a charging current is set to a first preset current, and the constant current charging of the rechargeable battery 30 is performed by using the first preset current until the rechargeable battery 30 reaches the first preset voltage for the first instance. Referring to FIGS. 2 and 3, a curve 40 of FIG. 3 illustrates the variations in the instantaneous voltage of the lithium-polymer rechargeable battery 30 while being charged. In the first stage of the charging of the lithium-polymer rechargeable battery 30, the lithium-polymer rechargeable battery 30 is for example, charged from a voltage of 3V ($V_1$) to a voltage of 4.0V ($V_2$) in step 101. According to the above-mentioned operation conditions of the constant current charging, the first preset current is set to 0.8 C, and the first preset voltage is set to 4.0V. A controller 201 enables a charger circuit 203 to generate a constant current of 0.8 C for charging the lithium-polymer rechargeable battery 30. Also, the controller 201 instructs a voltage detection circuit 205 to detect the instantaneous voltage of the lithium-polymer rechargeable battery 30 at a predetermined time interval (such as one second), and then the controller 201 determines whether the instantaneous voltage has reached 4.0V. If the instantaneous voltage of the lithium-polymer rechargeable battery 30 has reached 4.0V, the process of the charging method 10 will go to step 103. If the instantaneous voltage of the lithium-polymer rechargeable battery 30 has not yet reached 4.0V, the constant current charging of the lithium-polymer rechargeable battery 30 will continue with a constant current of 0.8 C until the instantaneous voltage of the lithium-polymer rechargeable battery 30 reaches 4.0V for the first instance.

In the second stage of the charging of the lithium-polymer rechargeable battery 30, the lithium-polymer rechargeable battery 30 is charged from a voltage of 4.0V ($V_2$) to a voltage of 4.1V ($V_3$) in step 101. According to the above-mentioned operation conditions of constant current charging, the first preset current is set to 0.2 C, and the first preset voltage is set to 4.1V. The controller 201 enables the charger circuit 203 to generate a constant current of 0.2 C for charging the lithium-polymer rechargeable battery 30. Also, the controller 201 instructs the voltage detection circuit 205 to detect the instantaneous voltage of the lithium-polymer rechargeable battery 30 at a predetermined time interval (such as one second), and then the controller 201 determines whether the instantaneous voltage has reached 4.1V. If the instantaneous voltage of the lithium-polymer rechargeable battery 30 has reached 4.1V, the process of the charging method 10 will go to step 103. If the instantaneous voltage of the lithium-polymer rechargeable battery 30 has not yet reached 4.1V, the constant current charging of the lithium-polymer rechargeable battery 30 will continue with a constant current of 0.2 C until the instantaneous voltage of the lithium-polymer rechargeable battery 30 reaches 4.1V for the first instance.

In the third stage of the charging of the lithium-polymer rechargeable battery 30, the lithium-polymer rechargeable battery 30 is charged from a voltage of 4.1V ($V_3$) to a voltage of 4.2V ($V_4$) in step 101. According to the above-mentioned operation conditions of constant current charging, the first preset current is set to 0.1 C, and the first preset voltage is set to 4.2V. The controller 201 enables the charger circuit 203 to generate a constant current of 0.1 C for charging the lithium-polymer rechargeable battery 30. Also, the controller 201 instructs the voltage detection circuit 205 to detect the instantaneous voltage of the lithium-polymer rechargeable battery 30 at a predetermined time interval (such as one second), and then the controller 201 determines whether the instantaneous voltage has reached 4.2V. If the instantaneous voltage of the lithium-polymer rechargeable battery 30 has reached 4.2V, the process of the charging method 10 will go to step 103. If the instantaneous voltage of the lithium-polymer rechargeable battery 30 has not yet reached 4.2V, the constant current charging of the lithium-polymer rechargeable battery 30 will continue with a constant current of 0.1 C until the instantaneous voltage of the lithium-polymer rechargeable battery 30 reaches 4.2V for the first instance.

In step 103, a current difference value is subtracted from the charging current used by the rechargeable battery 30 to reach the first preset voltage in the preceding instance so as to obtain a new charging current, and then the constant current charging of the rechargeable battery 30 is performed by using the new charging current thus obtained until the rechargeable battery 30 reaches the first preset voltage again. Step 103 is described in detail hereunder by taking the lithium-polymer rechargeable battery 30 as an example. At this point, step 101 of the first stage of the charging of the lithium-polymer rechargeable battery 30 has been completed. The controller 201 carries out computation such that a current difference value (such as 50 mA) is subtracted from a charging current of 0.8 C used in conjunction with the first preset voltage 4.0V ($V_2$) in the first stage, so as to obtain the new charging current. Subsequently, the controller 201 instructs the charger circuit 203 to generate a constant current for the new charging current in order to charge the lithium-polymer rechargeable battery 30. Also, the controller 201 instructs the voltage detection circuit 205 to detect the instantaneous voltage of the lithium-polymer rechargeable battery 30 at a predetermined time interval (such as one second), and then the controller 201 determines whether the instantaneous voltage has reached the first preset voltage (4.0V) again. If the instantaneous voltage of the lithium-polymer rechargeable battery 30 reaches 4.0V again, the process of the charging method 10 will go to step 105. If the instantaneous voltage of the lithium-polymer rechargeable battery 30 has not yet reached 4.0V, the constant current charging of the lithium-polymer rechargeable battery 30 will continue with the new charging current until the instantaneous voltage of the lithium-polymer rechargeable battery 30 reaches 4.0V again.

In addition, the aforesaid current difference value can be set to the common difference of a decreasing arithmetic progression or any other sequence, wherein the common difference ranges between 0.8 C and 0.2 C. Based on the required operation conditions of the constant current charging of the lithium-polymer rechargeable battery 30, the charging current in the first stage is set to 0.8 C, and the charging current in the second stage is set to 0.2 C.

Step 103 is hereunder described and illustrated by the completed step 101 of the second stage of the charge of the lithium-polymer rechargeable battery 30. The controller 201 carries out computation such that a current difference value (such as 50 mA) is subtracted from the 0.2 C charging current used in conjunction with the first preset voltage 4.1V ($V_3$) in the second stage, so as to obtain a new charging current. Subsequently, the controller 201 instructs the charger circuit 203 to generate a constant current for the new charging current so as to charge the lithium-polymer rechargeable battery 30. Also, the controller 201 instructs the voltage detection circuit 205 to detect the instantaneous voltage of the lithium-polymer rechargeable battery 30 at a predetermined time interval (such as one second), and then the controller 201 determines whether the instantaneous voltage has reached the first preset voltage (4.1V) again. If the instantaneous voltage of the lithium-polymer rechargeable battery 30 has reached 4.1V again, the process of the charging method 10 will go to step 105. If the instantaneous voltage of the lithium-polymer rechargeable battery 30 has not yet reached 4.1V, the constant current charging of the lithium-polymer rechargeable battery 30 will continue with the new charging current until the instantaneous voltage of the lithium-polymer rechargeable battery 30 reaches 4.1V again.

Furthermore, the current difference value can be set to the common difference of a decreasing arithmetic progression or any other sequence, wherein the common difference ranges between 0.2 C and 0.1 C. Based on the required operation conditions of the constant current charging of the lithium-polymer rechargeable battery 30, the charging current in the second stage is set to 0.2 C, and the charging current in the third stage is set to 0.1 C.

Take the completed step 101 of the third stage of the charging of the lithium-polymer rechargeable battery 30 as an example. The instantaneous voltage of the lithium-polymer rechargeable battery 30 has reached charging voltage ($V_{chg}$) for the first instance, and the lithium-polymer rechargeable battery 30 undergoes the constant voltage charging again instead of the charging based on the charging current adjustably reduced by the charger circuit 203. The actual current of the lithium-polymer rechargeable battery 30 will automatically decrease with the difference in voltage between the lithium-polymer rechargeable battery 30 and the charging device 20 unless and until the average current is less than 0.05 C; such that the controller 201 determines that the charging process is completed and should be immediately stopped.

Step 105 repeats step 103 until the new charging current equals to the second preset current. The second preset current can be set to any value less than the first preset current value. Step 105 is hereunder described in detail and illustrated with the lithium-polymer rechargeable battery 30. Prior to the commencement of step 105, step 103 of the first stage of charging of the lithium-polymer rechargeable battery 30 has been completed, and the instantaneous voltage of the lithium-polymer rechargeable battery 30 has reached 4.0V. The controller 201 determines whether the new charging current equals the second preset current. Upon an affirmative determination, the process of the charging method 10 goes to step 107. Upon a negative determination, the process of the charging method 10 goes back to step 103. In this regard, the second preset current is set to 0.2 C.

Step 105 is hereunder described in detail and illustrated with completed step 103 of the second stage of the charging of the lithium-polymer rechargeable battery 30. The instantaneous voltage of the lithium-polymer rechargeable battery 30 has reached 4.1V. The controller 201 determines whether the new charging current equals the second preset current. The controller 201 has to stop the charging of the lithium-polymer rechargeable battery 30 as soon as the instantaneous voltage of the lithium-polymer rechargeable battery 30 reaches 4.1V; meanwhile, the voltage of the lithium-polymer rechargeable battery 30 is likely to drop. Upon an affirmative determination, the process of the charging method 10 goes to step 107. Upon a negative determination, the process of the charging method 10 goes back to step 103. In this regard, the second preset current is set to 0.1 C.

Before the instantaneous voltage of the lithium-polymer rechargeable battery 30 reaches the charging voltage ($V_{chg}$) for the first instance, a purpose of step 103 and step 105 is to decrease the charging current of the rechargeable battery 30 piecemeal and slightly, so as to mitigate the negative effect of the charging current on the rechargeable battery 30 and therefore shorten the duration of the charging of the rechargeable battery 30. Also, another purpose of step 103 and step 105 is to ensure that the charging of the rechargeable battery 30 completed in this stage will enable the instantaneous voltage of the rechargeable battery 30 to reach or approximate the first preset voltage; in so doing, upon the commencement of the next charging stage, the instantaneous voltage of the rechargeable battery 30 rises from the first preset voltage or rises from a voltage level that approximates the first preset voltage.

In step 107, the second preset current of step 105 is used as another new charging current, so as to perform the constant current charging of the rechargeable battery 30 by the second preset current until the rechargeable battery 30 reaches the second preset voltage for the first instance. Step 107 is hereunder described in detail and illustrated with the lithium-polymer rechargeable battery 30. At this point, step 101, step 103 and step 105 of the first stage of the charging of the lithium-polymer rechargeable battery 30 have been completed, and subsequently, the second stage of the constant current charging is to begin. As mentioned earlier, the instantaneous voltage of the lithium-polymer rechargeable battery 30 equals or approximates the first preset voltage 4.0V ($V_2$). The instantaneous voltage of the lithium-polymer rechargeable battery 30 starts to rise from the first preset voltage 4.0V ($V_2$) or a voltage level that approximates the first preset voltage 4.0V ($V_2$), because the lithium-polymer rechargeable battery 30 is charged by a constant current of 0.2 C (the second preset current). The controller 201 instructs the charger circuit 203 to generate the constant current (0.2 C) of the second preset current for charging the lithium-polymer rechargeable battery 30. Also, the controller 201 instructs the voltage detection circuit 205 to detect the instantaneous voltage of the lithium-polymer rechargeable battery 30 at a predetermined time interval (such as one second). Subsequently, the controller 201 determines whether the instantaneous voltage has reached the second preset voltage (4.1V) for the first instance. Upon determining that the instantaneous voltage of the lithium-polymer rechargeable battery 30 has reached the second preset voltage (4.1V) for the first instance, step 107 ends. Upon determining that the instantaneous voltage of the lithium-polymer rechargeable battery 30 has not yet reached the second preset voltage (4.1V), the constant current charging of the lithium-polymer rechargeable battery 30 continues with the second preset current (0.2 C) until the instantaneous voltage of the lithium-polymer rechargeable battery 30 reaches the second preset voltage (4.1V) for the first instance.

The constant current charging operation in the third stage which follows completed step 101, step 103, and step 105 of the second stage of the charging of the lithium-polymer rechargeable battery 30 is described below. As mentioned earlier, the instantaneous voltage of the lithium-polymer rechargeable battery 30 equals or approximates the first preset voltage 4.1V ($V_3$). The instantaneous voltage of the lithium-polymer rechargeable battery 30 starts to rise from the first preset voltage 4.1V ($V_3$) or from a voltage level that approximates the first preset voltage 4.1V ($V_3$), because the constant current charging of the lithium-polymer rechargeable battery 30 is performed by the second preset current (0.1 C). The controller 201 instructs the charger circuit 203 to generate a constant current of the second preset current (0.1 C) for charging the lithium-polymer rechargeable battery 30. Also, the controller 201 instructs the voltage detection circuit 205 to detect the instantaneous voltage of the lithium-polymer rechargeable battery 30 at a predetermined time interval (such as one second), and then the controller 201 determines whether the instantaneous voltage has reached the second preset voltage (4.2V) for the first instance. Upon determining that the instantaneous voltage of the lithium-polymer rechargeable battery 30 has reached the second preset voltage (4.2V) for the first instance, step 107 ends. Upon determining that the instantaneous voltage of the lithium-polymer rechargeable battery 30 has not yet reached the second preset voltage (4.2V), the constant current charging of the lithium-polymer rechargeable battery 30 continues with the second preset current (0.1 C) until the instantaneous voltage of the lithium-polymer rechargeable battery 30 reaches the second preset voltage (4.2V) for the first instance.

In addition, the second preset current in step 107 can be directly set according to the required operation conditions of the constant current charging of the lithium-polymer rechargeable battery 30.

Upon the completion of step 101 through step 107 of the third stage of the charging of the rechargeable battery 30, the instantaneous voltage of the lithium-polymer rechargeable battery 30 reaches the charging voltage ($V_{chg}$). Afterward, according to the required operation conditions of the constant voltage charging of the lithium-polymer rechargeable battery 30, the constant voltage charging of the lithium-polymer rechargeable battery 30 continues with the constant voltage 4.2V, and the charging operation is deemed done as soon as the charging current is less than or equal to 0.05 C; meanwhile, the rechargeable battery 30 has been fully charged.

As shown in FIG. 2, the charging device 20 is configured for the implementation of the aforesaid charging method 10 of the present invention. The charging device 20 comprises the controller 201, the charger circuit 203, and the voltage detection circuit 205. The controller 201 connects and controls the charger circuit 203 and the voltage detection circuit 205 respectively, and performs step 101 through step 107 of the charging method 10. The charger circuit 203 is controlled by the controller 201 and connected to the rechargeable battery 30, and is configured to provide all the charging currents required for step 101 through step 107. The voltage detection circuit 205 is controlled by the controller 201, connected to the rechargeable battery 30, and configured to detect the voltage of the rechargeable battery 30 and send the detected voltage signal to the controller 201.

The controller 201, the voltage detection circuit 205, and the lithium-polymer rechargeable battery 30 can be packaged as a battery pack, and the battery pack is enclosed by a dashed line shown in FIG. 2. The controller 201, the charger circuit 203, and the voltage detection circuit 205 can be directly implemented by equivalent conventional circuits or equivalent conventional circuit elements, respectively.

According to the present invention, the value of the charging voltage ($V_{chg}$) employed by the charging method 10 and the charging device 20 can be set to the maximum charging voltage 4.2V according to the required operation conditions for the constant current charging of the lithium-polymer rechargeable battery 30.

The charging method and the charging device of the present invention are effective in shortening the duration of the charging of a rechargeable battery and preventing the extension of the charging duration which might otherwise arise from the great and immediate reduction in the charging current when a conventional multiple-stage charging means is employed to perform the shifting of charging stages. The above-mentioned points are the remarkable advantages of the present invention.

However, the above description is about preferred embodiments of the present invention and is not intended to limit the scope of implementation of the present invention. It should be understood by persons skilled in the art that many modifications and variations can be made according to the spirit and principle in the disclosure of the present invention and should still be attributed to the substantive contents of the present invention.

What is claimed is:

1. A charging method fit for use with and applicable to a rechargeable battery, the charging method being configured to charge the rechargeable battery to a first preset voltage and then charge the rechargeable battery to a second preset voltage, the charging method comprising the steps of:
   (a) using a first preset current as a charging current, followed by performing constant current charging of the rechargeable battery by the first preset current until the rechargeable battery reaches the first preset voltage for the first instance;
   (b) subtracting a current difference value from the charging current used by the rechargeable battery to reach the first preset voltage in the preceding instance so as to obtain a new charging current, followed by performing constant current charging of the rechargeable battery by said new charging current thus obtained until the rechargeable battery reaches the first preset voltage again;
   (c) repeating step (b) until said new charging current equals a second preset current; and
   (d) using the second preset current of step (c) as another new charging current, followed by performing constant current charging of the rechargeable battery by the second preset current until the rechargeable battery reaches the second preset voltage for the first instance.

2. The charging method of claim 1, wherein the constant current charging step of step (a) through step (d) is performed at the same charging voltage value.

3. The charging method of claim 1, wherein the second preset current of step (c) enables an instantaneous voltage of the rechargeable battery to equal or reach the first preset voltage as soon as constant current charging of the rechargeable battery is performed with said new charging current.

4. The charging method of claim 1, wherein the second preset current of step (c) is directly set according to the operation conditions for constant current charging of the rechargeable battery or is less than the first preset current value.

5. The charging method of claim 1, wherein step (a) through step (d) is performed before the voltage of the rechargeable battery is less than or equal to a charging voltage.

6. The charging method of claim 1, further comprising the step of performing, upon determining that the voltage of the rechargeable battery has reached a charging voltage for the first instance, constant voltage charging of the rechargeable battery until the charging current thereof is less than a preset value.

7. The charging method of claim 1, wherein the rechargeable battery comprises at least a lithium-polymer rechargeable battery cell.

8. The charging method of claim 1, wherein the rechargeable battery comprises at least a lithium-ion rechargeable battery cell.

9. The charging method of claim 1, wherein the rechargeable battery comprises at least a rechargeable battery cell.

10. The charging method of claim 1, wherein the second preset current of step (d) is directly set to a charging current value for replacing said new charging current.

11. A charging device fit for use with and applicable to a rechargeable battery, the charging device being configured to charge the rechargeable battery to a first preset voltage and then charge the rechargeable battery to a second preset voltage, the charging device comprising:
  a controller connected to a charger circuit and a voltage detection circuit and configured to perform the following processes:
    (a) using a first preset current as a charging current, followed by performing constant current charging of the rechargeable battery by the first preset current until the rechargeable battery reaches the first preset voltage for the first instance;
    (b) subtracting a current difference value from the charging current used by the rechargeable battery to reach the first preset voltage in the preceding instance so as to obtain a new charging current, followed by performing constant current charging of the rechargeable battery by said new charging current thus obtained until the rechargeable battery reaches the first preset voltage again;
    (c) repeating process (b) until said new charging current equals a second preset current; and
    (d) using the second preset current of process (c) as another new charging current, followed by performing constant current charging of the rechargeable battery by the second preset current thus obtained until the rechargeable battery reaches the second preset voltage for the first instance;
  the charger circuit being controlled by the controller, connected to the rechargeable battery, and configured to provide the charging current for process (a) through process (d); and
  the voltage detection circuit being controlled by the controller, connected to the rechargeable battery, and configured to detect the voltage of the rechargeable battery.

12. The charging device of claim 11, wherein the constant current charging step of process (a) through process (d) is performed at the same charging voltage value.

13. The charging device of claim 11, wherein the second preset current of process (c) enables an instantaneous voltage of the rechargeable battery to equal or reach the first preset voltage as soon as constant current charging of the rechargeable battery is performed with said new charging current.

14. The charging device of claim 11, wherein the second preset current of process (c) is directly set according to the operation conditions for constant current charging of the rechargeable battery or is less than the first preset current value.

15. The charging device of claim 11, wherein process (a) through process (d) is performed before the voltage of the rechargeable battery is less than or equal to a charging voltage.

16. The charging device of claim 11, further comprising the process of performing, upon determining that the voltage of the rechargeable battery has reached a charging voltage for the first instance, the constant voltage charging of the rechargeable battery is performed until the charging current of the rechargeable battery is less than a preset value.

17. The charging device of claim 11, wherein the rechargeable battery comprises at least a lithium-polymer rechargeable battery cell.

18. The charging device of claim 11, wherein the rechargeable battery comprises at least a lithium-ion rechargeable battery cell.

19. The charging device of claim 11, wherein the rechargeable battery comprises at least a rechargeable battery.

20. The charging device of claim 11, wherein the second preset current of process (d) is directly set to a charging current value for replacing said new charging current.

* * * * *